United States Patent [19]
Storm

[11] 3,738,440
[45] June 12, 1973

[54] ONE WHEELED FRONT DRIVE UNIT
[76] Inventor: Nelson Storm, 213 Perry, Rossville, Ill. 60963
[22] Filed: Jan. 19, 1972
[21] Appl. No.: 218,904

[52] U.S. Cl............ 180/13, 180/26 R, 180/31
[51] Int. Cl............................................ B62m 7/10
[58] Field of Search ........... 180/11, 12, 13, 26 R, 180/31

[56] References Cited
UNITED STATES PATENTS

| 860,251 | 7/1907 | Schmoele | 180/13 |
| 2,503,106 | 4/1950 | Fritz | 180/13 X |
| 3,155,185 | 11/1964 | Allen et al. | 180/31 |
| 3,340,947 | 9/1967 | Hollinshead et al. | 180/31 |

FOREIGN PATENTS OR APPLICATIONS

| 1,097,127 | 2/1955 | France | 180/26 R |
| 550,077 | 10/1956 | Italy | 180/11 |

Primary Examiner—Leo Friaglia
Assistant Examiner—Leslie J. Paperner
Attorney—Fred L. Witherspoon, Jr. and Anthony T. Lane

[57] ABSTRACT

A one wheeled front drive unit adapted to pull a vehicle component removably attached thereto wherein the front drive unit includes a frame assembly pivotally mounting a motor driving a pinion drivably connected to a sprocket affixed to a wheel rotatably carried by said frame assembly. Support means are pivotally connected to the frame assembly through a bearing assembly and are provided with coupling means for removably attaching a vehicle component thereto.

4 Claims, 6 Drawing Figures

PATENTED JUN 12 1973

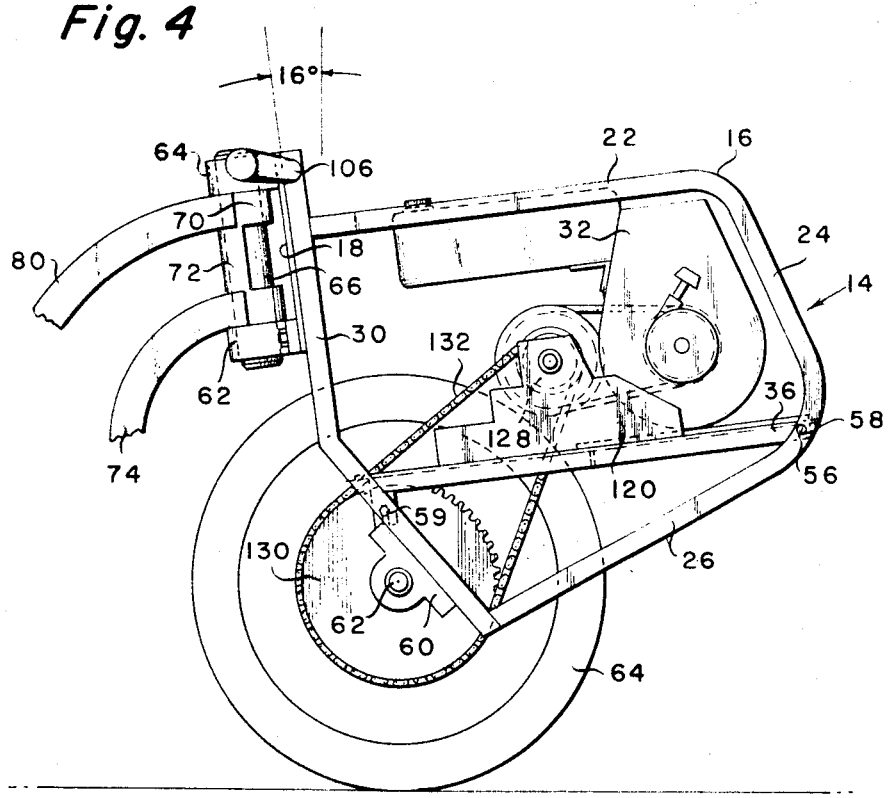
Fig. 4
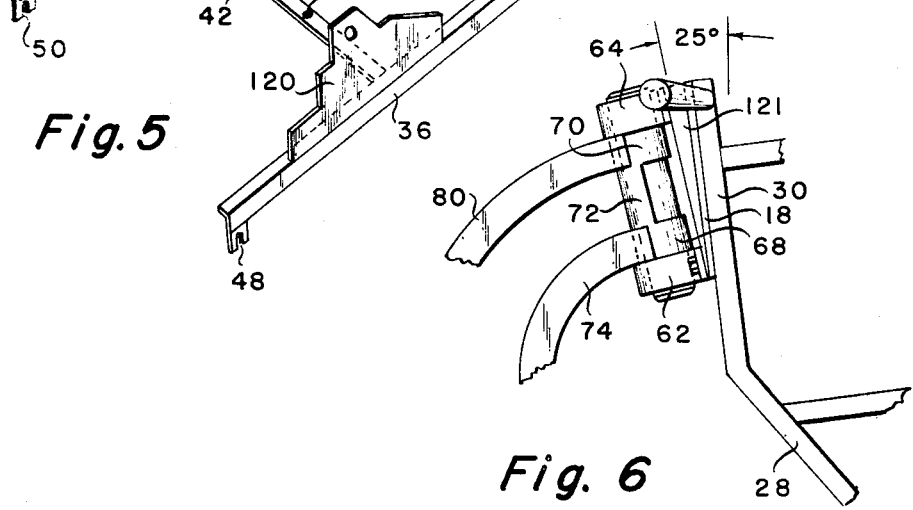
Fig. 5
Fig. 6

ONE WHEELED FRONT DRIVE UNIT

SUMMARY OF THE INVENTION

This invention relates to a one wheeled front drive unit adapted to pull a vehicle component removably attached thereto.

It is an object of this invention to provide a one wheeled front drive unit which is adapted to pull various types of vehicle components.

It is another object of this invention to provide a one wheeled front drive unit wherein the motor and drive pinion are pivotally mounted on the frame rotatably carrying a wheel with sprocket attached thereto so that a flexible chain drivably connecting the sprocket and pinion may be properly adjusted by pivoting of the motor and associated pinion.

It is another object of this invention to provide a one wheeled front drive unit having a frame assembly with pivotally mounted support means provided with coupling means for attachment to a vehicle component and further wherein the angularity of the pivoting of the support means may be varied.

The above and additional objects will become more apparent when taken in conjunction with the following detailed description and drawings, showing by way of example a preferred embodiment of this invention.

DESCRIPTION OF DRAWINGS

FIG. 4 is an elevational view illustrating details of the one wheeled front power drive unit;

FIG. 5 is a perspective view of the motor support frame; and

FIG. 6 is an elevational view of a portion of the front power drive unit, showing the bearing structure provided for turning and the shimming that may be required depending upon the type of vehicle being pulled.

DESCRIPTION OF THE INVENTION

Figure 1:
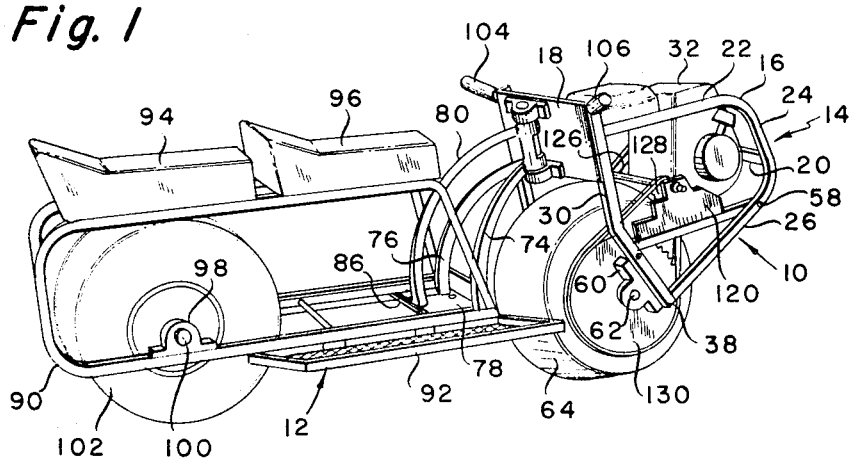
FIG. 1 is a perspective view illustrating the one wheeled front power drive unit connected to a one wheeled tandem seat unit.
Figure 2:
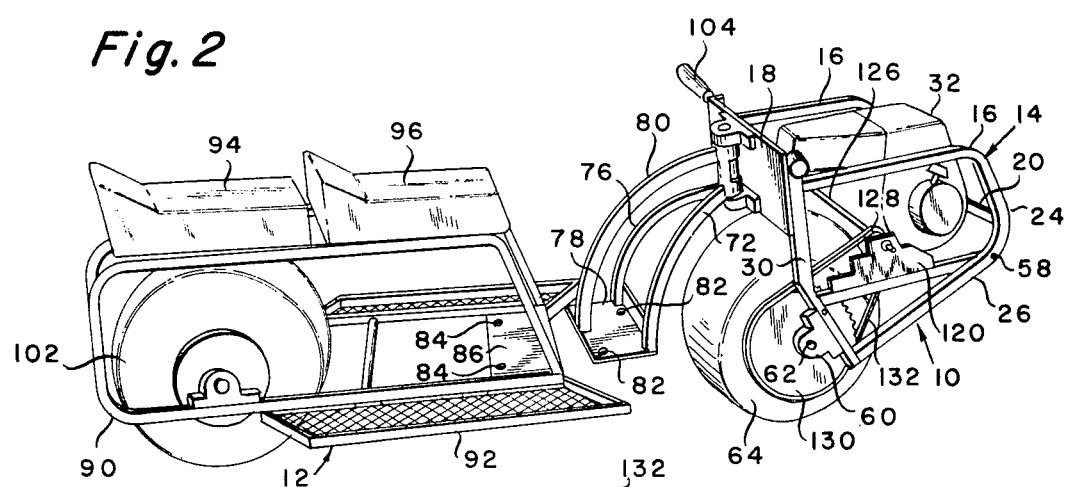
FIG. 2 is a perspective of the vehicle combination of FIG. 1 showing the two vehicle components separated.

As illustrated in FIGS. 1 and 2, the vehicle combination comprises a one wheeled front power drive unit 10 attached to a one wheeled tandem seat unit 12. The one wheeled front power drive unit 10 comprises a frame assembly 14 including a pair of spaced apart and parallel five sided frames 16 retained in spaced and parallel relation by rear cross plate 18 and front cross brace 20. More particularly, each frame 16 includes a top generally horizontal box bar 22 with a front box bar 24 extending downwardly from the forward end of the top bar 22 and a bottom box bar 26 extending rearwardly and slightly downwardly from the termination of the front bar 24. A lower rear box bar 28 extends upwardly at an angle from the end of the bottom bar 26 and an upper rear bar 30 connects the end of lower rear bar 28 to the rear end of top bar 22.

As previously set forth, the two frames 16—16 are held assembled in spaced and parallel relation at the rear by cross plate 18 which is secured to the upper portion of each upper rear bar 30 and at the front by front cross brace 20 affixed to the generally midpoint of each front box bar 24.

The motor 32 is pivotally mounted on the frame assembly 14 by means of motor mounting 34 (FIG. 5) which comprises a pair of sides 36 and 38 held in spaced and parallel manner by forward cross member 40 connected to the forward ends of sides 36 and 38 and middle cross member 42 affixed to the sides 36 and 38 midway their ends, thus the rear end of the motor mounting is open. Each forward end of the sides 36 and 38 is provided with a hole 44 and 46, respectively, to receive a pivot pin. The rear end of each side is provided with a vertical slot 48 and 50, respectively.

The motor 32 is secured to the mounting 34 by means of bolts passing through holes 54 in forward cross member 40 and middle cross member 42. Referring to FIG. 4, each bottom bar 26 is provided with a hole 56 which holes receive pivot pins 58 inserted in holes 44 of the motor mounting 34 to pivotally support said mounting between the frames 16 at the forward end thereof. Each lower rear bar 28 is provided with a hole to receive a bolt and nut assembly 59 so that mounting sides 36 and 38 with their respective vertical slots 48 and 50 may fit over the bolts of the nut and bolt assemblies 59 whereby the pivoted position of the motor mounting 34 may be adjustably positioned.

As best shown in FIG. 4, each lower rear box bar 28 is equipped with a trunnion bearing assembly 60 to provide a bearing arrangement for wheel axle 62 rotatably carrying wheel 64.

The rear cross plate 18 mounts a pair of vertically spaced and aligned pillow block bearings 62 and 64 with a king pin 66 extending therethrough to pivotally support circular bearings 68 and 70 carried thereon between the pillow block bearings 62 and 64 and held in spaced relation by semi-cylindrical member 72 affixed to each circular bearing 68 and 70. Referring to FIGS. 1 and 2, curved support forks 74 and 76 are connected to the circular bearing 68 and diverge downwardly to be secured to horizontal coupling plate 78. A single curved bracket 80 is connected to the circular bearing 70 and curves downwardly to be attached to coupling plate 78 at a point rearwardly and intermediate support forks 74 and 78. The coupling plate 78 is provided with a plurality of holes 82 adapted to register with holes 84 and in coupling member 86 carried by the vehicle component 12 to be pulled by the front drive unit 10. Preferably quick fastening means are employed to rigidly connect the coupling plate 78 to the coupling member 86.

As illustrated in FIGS. 1 and 2, the one wheeled tandem seat unit 12 comprises a base frame 90 having side outriggers 92 for foot support and a pair of seats 94 and 96. The frame 90 is provided with a pair of trunnin bearings 98 to rotatably support the axle 100 of wheel 102. The frame 90 is also provided with a coupling member 86 adapted to be secured to coupling plate 78 of the front drive unit 10. In order to steer the vehicle, a pair of handle bars 104 and 106 are affixed to upper ends of upper rear bars 30—30.

Instead of the tandem unit 12 illustrated in FIGS. 1 and 2, the front drive unit 10 may be employed to pull a carryall 110 which includes a frame 112 mounting a pair of longitudinally disposed seats 114 and 116 and a pair of wheels 118 and 120. This carryall 112 is secured to the front drive unit 10 in the same manner as that described with regard to the combination shown in FIGS. 1 and 2.

Figure 3:
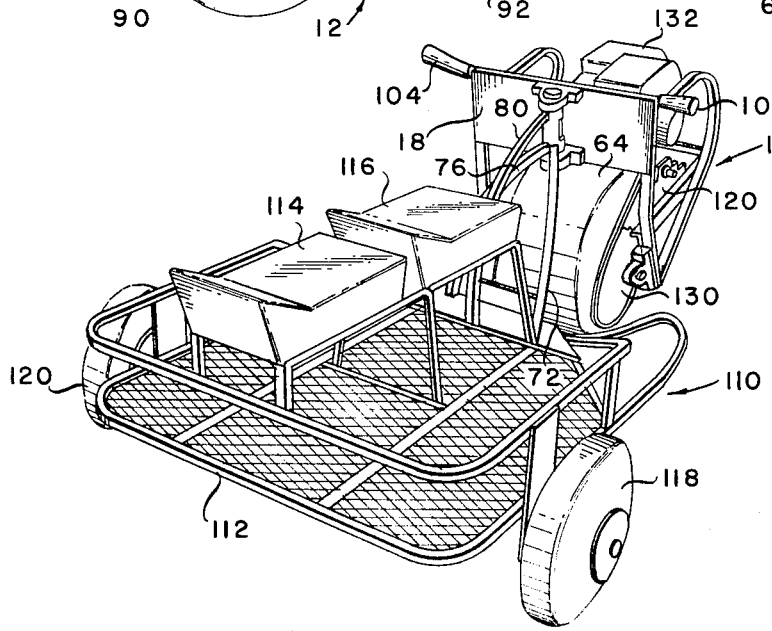
FIG. 3 is a perspective view showing the one wheeled front power drive connected to a carryall.

When the front drive unit 10 is used in conjunction with a two-wheeled rear vehicle such as the carryall 112 illustrated in FIG. 3, the vertical angle between the cross plate 18 and the vertical should be approximately 16°the other as illustrated in FIG. 4. On the other hand when the front drive unit 10 is used with a single wheel vehicle such as the tandems of FIGS. 1 and 2, then there should be angle of 25° between the cross plate 18 and the vertical as illustrated in FIG. 6. In order to accomplish this, a shim 121 is positioned between the cross plate 18 and the pillow block bearings 62 and 64 with the large portion of the shim wedge being placed at the top to enlarge the angle from the normal 16° as in FIG. 4 to 25° as in FIG. 6.

As shown in FIG. 5, the motor mounting frame assembly 34 also has a pair of aligned parallel support brackets 120-122 mounted on frame sides 36 and 38, respectively. As illustrated in FIGS. 1 and 2, a drive shaft 126 carried by bracket supports 120 and 122 has a pinion 128 fixedly carried thereon in alignment with sprocket 130 fixed to axle 62 mounting wheel 64. The pinion 128 and sprocket 130 are operatively connected by a flexible chain 132. In order to maintain proper adjustment of the chain 132, the motor mounting frame assembly 34 is pivotable about pivot pin 58. The pivoted adjustment is maintained by nut and bolt assemblies 59 cooperating with slots 48 and 50 in the rear end portions of side frames 36 and 38.

The motor 32 used in this front wheel drive unit is of the more or less conventional type of internal combustion engine found on powerized lawnmowers and the like and may be either two or four cycle.

The use of the device of this invention should be clear in view of the foregoing description. The front drive unit 10 is connected to a suitable vehicle component 12 by means of fasteners which connects coupling plate 78 with coupling member 86. The front drive unit is steered by handle bars 104 and 106. By having the drive wheel in front, the stability and ease of steering are considerably enhanced.

I claim:

1. A one wheeled front drive unit adapted to pull a vehicle component removably attached thereto, said front drive unit comprising:
    a frame assembly including a pair of parallel spaced frames held in position by a rear cross plate connected between corresponding rearward sides of said frames and a forward cross brace connected between corresponding frame sides on the forward end of said frames,
    a mounting frame assembly mounted between the aforesaid pair of spaced parallel frames for pivoting movement relative to the forward portion of said frames,
    a motor carried by the mounting frame assembly,
    a pair of spaced upstanding brackets mounted on the mounting frame assembly,
    a drive shaft rotatably carried by the pair of spaced upstanding brackets,
    a single wheel rotatably carried between the rearward portions of the frames,
    a sprocket mounted for rotation with said wheel,
    a pinion affixed to the drive shaft in alignment with the sprocket,
    a flexible chain drivably connecting the pinion and sprocket,
    cooperating means on the rearward end of the mounting frame assembly and the rearward end of the parallel spaced frames to retain the pinion in proper relation to the sprocket so that proper engagement is achieved between the flexible chain, sprocket and pinion,
    bearing means secured to the rear cross plate,
    three curved supports connected to said bearing means for rotation about a generally vertically axis, said three curved supports extending downwardly in spaced relation to a position below the bearing means,
    a coupling means secured to the lower extremities of the three curved supports, said coupling means being adapted to be secured to a vehicle component to be pulled by the front drive unit.

2. The invention as set forth in claim 1 and wherein the mounting frame assembly comprises a pair of side frames held in spaced and parallel position by a front bracket connecting the front ends of the side frames and a cross bracket connected to the side frames intermediate their lengths and means are provided for partially mounting the end portions of the side frames to adjacent frames of the frame assembly.

3. The invention as set forth in claim 1 wherein the vertical angularity of the bearing means with respect to the vertical may be varied depending on the type of vehicle component being pulled by the front drive unit.

4. The invention as set forth in claim 2 and wherein the motor carried on the mounting frame assembly is positioned forward of the axis of rotation of the front drive wheel.

* * * * *